US008149718B2

(12) United States Patent
Marilly et al.

(10) Patent No.: US 8,149,718 B2
(45) Date of Patent: Apr. 3, 2012

(54) COMMUNICATION NETWORK MANAGEMENT SYSTEM FOR AUTOMATIC REPAIR OF FAILURES

(75) Inventors: Emmanuel Marilly, Saint-Michel-sur-Orge (FR); Olivier Martinot, Draveil (FR); Mohamed Adel Saidi, Antony (FR); Sylvain Squedin, Nozay (FR)

(73) Assignee: Alcatel Lucent, Paris (FR)

( * ) Notice: Subject to any disclaimer, the term of this patent is extended or adjusted under 35 U.S.C. 154(b) by 310 days.

(21) Appl. No.: 11/572,904

(22) PCT Filed: Jul. 1, 2005

(86) PCT No.: PCT/FR2005/050530
§ 371 (c)(1),
(2), (4) Date: Mar. 19, 2007

(87) PCT Pub. No.: WO2006/021702
PCT Pub. Date: Mar. 2, 2006

(65) Prior Publication Data
US 2007/0260911 A1    Nov. 8, 2007

(30) Foreign Application Priority Data
Jul. 30, 2004 (FR) .................... 04 08505

(51) Int. Cl.
*G01R 31/08* (2006.01)
*G06F 11/00* (2006.01)
*G08C 15/00* (2006.01)
*H04J 3/16* (2006.01)
*H04J 3/22* (2006.01)

(52) U.S. Cl. ......... 370/241; 370/242; 370/466; 370/467
(58) Field of Classification Search ............. 370/4, 216, 370/252, 217; 714/4; 702/103
See application file for complete search history.

(56) References Cited

U.S. PATENT DOCUMENTS 6,294,991 B1 *  9/2001  Allen et al. ............... 340/506
6,718,377 B1 *  4/2004  Bischoff et al. .......... 709/223
(Continued)

FOREIGN PATENT DOCUMENTS
EP      1335524      8/2003
(Continued)

OTHER PUBLICATIONS

M. Garijo et al, "A Multiagent System for Cooperative Network—Fault Management", Proceedings of the International Conference on the Practical Application of Intelligent Agents and Multi-Agent Technology—Apr. 22, 1996, pp. 279-294, XP002068055.

(Continued)

*Primary Examiner* — Chi Pham
*Assistant Examiner* — Farah Faroul
(74) *Attorney, Agent, or Firm* — Harness, Dickey & Pierce P.L.C.

(57) ABSTRACT

Disclosed is a management system for a communication network including a diagnostic module to determine a diagnosis based on information provided by network elements this diagnosis identifying a failure within the network. The management system also includes a repair module to determine one or several corrective actions based on at least this diagnosis and to transmit one or several commands corresponding to the corrective actions, to one or several network elements, to correct the failure.

15 Claims, 3 Drawing Sheets

U.S. PATENT DOCUMENTS

| | | | | |
|---|---|---|---|---|
| 6,772,096 B2* | 8/2004 | Murakami et al. | ............. | 702/184 |
| 7,496,532 B2* | 2/2009 | Johnson et al. | ............. | 705/36 R |
| 7,620,848 B1* | 11/2009 | Tanner | ............................ | 714/25 |
| 2002/0124070 A1* | 9/2002 | Pulsipher | ....................... | 709/223 |
| 2003/0174162 A1* | 9/2003 | Wu | ................................ | 345/736 |
| 2004/0120250 A1* | 6/2004 | Langevin et al. | ............. | 370/216 |
| 2004/0267592 A1* | 12/2004 | Ogushi et al. | ...................... | 705/9 |
| 2006/0156086 A1* | 7/2006 | Flynn et al. | .................... | 714/712 |
| 2006/0221913 A1* | 10/2006 | Hermel et al. | ................. | 370/338 |
| 2009/0257350 A1* | 10/2009 | Bugenhagen | ................. | 370/235 |

FOREIGN PATENT DOCUMENTS

| | | |
|---|---|---|
| EP | 1387526 | 2/2004 |
| WO | WO 98/24222 A2 | 6/1998 |

OTHER PUBLICATIONS

Jiann-Liang Chen et al, "A fuzzy expert system for network fault management", Systems, Man and Cybernetics, 1996, IEEE International Conference, Beijing, China, Oct. 14-17, 2996, New York, NY, USA< IEEE, vol. 1 Oct. 14, 1996, pp. 328-331, XP010206647.

* cited by examiner

COMMUNICATION NETWORK MANAGEMENT SYSTEM FOR AUTOMATIC REPAIR OF FAILURES

This invention relates to communication networks and is particularly but not exclusively applicable to packet-oriented communication networks. It more specifically concerns management of communication networks.

It is known that Network Management Systems (NMS) can be associated with communication networks, with the purpose of collecting alarms from network equipment, making a summary of these alarms, particularly using correlation methods, and displaying this summary or these alarms to an operator so that the operator can implement corrective action in the case of a failure of one or several items of this equipment. The concept of a "failure" must be understood in a very general sense meaning any type of hardware or software malfunction. Thus, incorrect configuration of a network element could be considered to be a failure (software), in the same way as an error in an IP router routing table or a port that has been accidentally closed.

Network management systems can also be used to configure network equipment. The operator can input new parameters using a man-machine interface and the network management system applies these new parameters to the equipment. In this way, the operator can correct a network failure in reaction to an alarm display.

Such a centralized analysis depends on collection of a large amount of data and alarms from many elements in the communication system. These elements may be equipment such as routers in the framework of an IP (Internet Protocol) communication network, but it could also relate to voice and optical switches, PABXs (Private Branch Exchanges) and Media Gateways in a so-called NGN (Next Generation Network), etc. A network element may also form part of such equipment, such as a card, for example.

Due to the many interactions between elements of a network, a single failure can generate a very large number of alarms. Thus, a failure on a card in an item of equipment may generate an alarm from all cards in other equipment connected to one of the ports on this card, and by cards in the equipment in which the failure occurred.

It is therefore difficult for the operator to determine which is the genuine failure among the large number of generated alarms, and even more so to determine the corrective action to be undertaken.

Progress has been made due to diagnostic systems that use this large number of alarms to determine the most probable cause(s).

These diagnostic systems are based, for example, on sets of rules, such as those based on the IlogRules™ product marketed by the Ilog company. They may also be based on neural networks, Bayesian networks, expert systems or other techniques, particularly artificial intelligence.

Some products worth mentioning are the Agilent company's "Fault Detective for Data Communications" (FDDC), Hewlett-Packard's "Network Node Manager" and "Network Node Manager Extended Topology" products, and the Cisco company's "Output Interpreter" and "Troubleshooting Assistant" (TAC) products.

Nevertheless, with these tools, the operator has to take action with each failure to determine the corrective action(s) to be undertaken and to trigger them. He then needs to reconfigure the network using the network management system or to connect to one or several items of equipment manually and send the appropriate CLI (Command Line Interface) commands.

Although this task is aided by state of the art diagnostic systems, it is still difficult and therefore expensive and subject to errors.

Indeed, the reconfiguration and manual connection to equipment phase is long and tedious. It is easier to make a mistake in a parameter of a CLI command and thus to provoke another network failure.

The determining of corrective actions phase is just as difficult for the operator, because if he wants the actions to be optimal, he needs to take account of network performance information and other parameters.

These tasks will become more and more difficult and expensive due to the increased complexity of networks, the number of available equipment types and their complexity.

Solutions are available to automate the configuration of communication network equipment depending on the determination of a diagnosis. Such solutions are, for example, described in "A Multiagent System for Cooperative Network-Fault Management" by Mercedes Garijo, Andrés Cancer and Julio J. Sanchez, published on Apr. 22 1996 in Proceedings of the International Conference on the Practical Application of Intelligent Agents and Multi-agent Technology, and also in "A Fuzzy Expert System for Network Fault Management" by Jiann-Liang Chen and Pei-Hwa Huang, published in October 1996 in Systems, Man and Cybernetics, IEEE International Conference in Beijing.

However, these systems do not include any means of checking that the corrective actions have actually corrected the problems that were detected. Furthermore, with these systems it is impossible to be sure that these corrective actions have not aggravated the situation. This problem is not even referred to in these documents.

The purpose of this invention is to automate the correction of failures in the managed communication network, while assuring that the detected problems are corrected or at least that the general situation of the telecommunication network is improved.

To achieve this, the first purpose of the invention is a system for management of a communication network comprising a diagnostic module capable of determining a diagnosis making use of information provided by elements in the communication network. This diagnosis identifies a failure within the communication network. This management system is characterized in that it also comprises a repair module designed:
- to determine one or several corrective actions based on a diagnosis received from the diagnostic module and
- to transmit one or several commands corresponding to the corrective action(s), to one or several elements in the communication network, in order to correct the failure.
- to transmit a diagnostic request to the diagnostic module to start determination of a new diagnosis by the diagnostic module.

Depending on the embodiments of the invention, the management system may have the following characteristics, individually or in combination:
- an iteration counter is incremented each time that a new diagnosis is started, and the management system stops the diagnostic and repair modules when the iteration counter has reached a predetermined threshold.
- the command(s) is (are) transmitted through a mediation module capable of transforming the command(s) formulated in a generic language, into specific commands compliant with command languages specific to the different equipment in the communication network.
- the repair module is arranged to communicate with a traffic optimization module if corrective actions cannot be satisfactorily determined to correct the failure, so as to eliminate or limit the influence of this failure on the behavior of the communication network.

the diagnostic module uses a Bayesian network to determine the diagnosis.

the diagnosis contains at least the description of the failure, the location of the failure and possibly an estimate of the probability associated with the diagnosis.

the diagnostic module sends a message compliant with the SNMP protocol containing the diagnosis to the repair module.

the repair module has a base of repair rules.

the rules may depend on the iterations counter.

the repair module has a history of diagnoses and corrective actions determined in each iteration and is capable of putting the communication network back into its state for a given iteration, if the diagnosis is not as correct when the threshold is reached as it was for this given iteration.

The second purpose of the invention is a method for management of a communication network comprising a first step to determine a diagnosis based on information provided by elements of the communication network. This method is characterized in that it also comprises a second step, if the diagnosis identifies a failure, to determine one or several corrective actions based on at least the diagnosis and transmission of one or several commands (C) corresponding to this or these corrective actions, to one or several elements of the communication network so as to correct the failure; the first step being automatically started at the end of the second step so as to form a processing cycle.

Depending on the embodiment of the invention, the management method may include the following characteristics either individually or in combination:

an iteration counter is incremented each time that a new diagnosis is triggered, the processing cycle being interrupted when this iteration counter has reached a predetermined threshold.

the command(s) is (are) transmitted through a mediation module capable of transforming the commands formulated in a generic language, into specific commands compliant with command languages specific to the different equipment in the communication network.

a command may be transmitted to a traffic optimization module if corrective actions cannot be determined to correct the failure satisfactorily so as to eliminate or limit the influence of this failure on the behavior of the communication network.

the first step uses a Bayesian network so as to determine the diagnosis.

the diagnosis contains at least the description of the failure, the location of the failure and possibly an estimate of the probability associated with the diagnosis.

a history is built up of the diagnoses and corrective actions determined in each iteration, and if the diagnosis is not as correct when the threshold is reached as it was for an earlier iteration, the state of the communication network for this earlier iteration is restored.

Thus, according to the invention, the repair module can automatically repair communication failures and/or undertake corrective actions to limit the consequences of failures and particularly their impacts on the SLA (Service Level Agreements) setup on the communication network, or it can make these repairs semi-automatically after validation by the operator.

After the correction, the diagnostic module is asked to make a new diagnosis so as to assure that this repair did not generate a new failure and if it did, to correct them in turn. A processing cycle may thus be implemented that must converge to repair the diagnosed failure.

A threshold may be fixed for the number of iterations in the loop, so as to prevent excessively long repair loops.

The invention and its characteristics and advantages will become clearer after reading the following description with reference to the appended figures.

FIG. 1 schematically shows the management system according to the invention.

Figure 1:
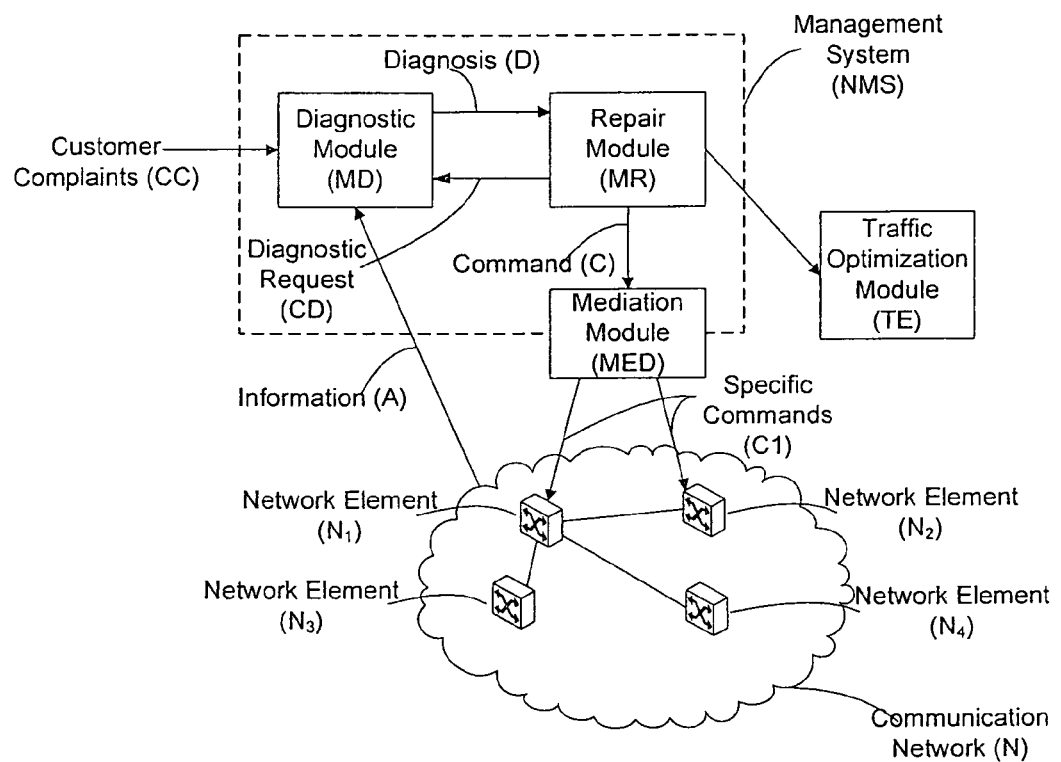

These appended drawings not only complete the description of the invention without limiting it, but in some cases also contribute to defining it.

According to the invention, the network management system comprises two main modules, namely firstly a diagnostic module MD and secondly a repair module MR.

The input into the diagnostic module consists of customer complaints CC and information from the network A. Customer complaints may be provoked by a drop in network performances or services used on the network. On reception of such a complaint, the diagnostic system MD can trigger a diagnostic search in order to determine the technical cause that led to this complaint. It can then take advantage of the information output from network elements.

A diagnostic search may also be triggered by information output from the individual elements in the communication network (in other words independently of the presence of a customer complaint).

Information Output from network elements may be of two main types:

Alarms, in other words asynchronous notifications transmitted by network elements to the network management system. These alarms are sent when an anomaly is detected by the element, when a measured value reaches a predetermined threshold, or more generally, when any type of event for which the configuration is such that occurrence should trigger an alarm. Therefore these alarms may indicate a failure, either software or hardware.

It may also relate to configuration or performance data that are not notified to the network management system NMS, but that the NMS must find in a Management Information Base (MIB).

It may also be required to setup active tests, active or passive measurements, and particularly end to end measurements.

In particular on reception of alarms, the diagnostic module MD may determine that these alarms represent a failure or a probable failure. After such a determination, it then triggers determination of the diagnosis, in other words the search for the failure.

As mentioned above, when a failure takes place, it may provoke alarms originating not only from the faulty network element, but also from "neighboring" network elements. Determination of the diagnosis consists of identifying the faulty network element (troubleshooting) and the type of failure (the failure name) based on this set of alarms originating from a multitude of network elements. In general, the diagnosis cannot be certain, and the diagnostic module MD then will provide the most probable diagnosis D, associating a probability value with it. It can also provide a list of several diagnoses, each being associated with a probability value, and each identifying a failure within the communication network N.

The diagnostic module may be a module known in the state of the art. As described above, various technologies may be used: neural networks, expert systems, rule based systems, etc. Commercial products mentioned above may be used.

The diagnostic module MD must preferably respect two criteria:

It must be "proactive", in other words the diagnostic search may be triggered other than by reception of alarms A from the communication network. In particular, it must be possible to trigger this search by an external event that may be either a customer complaint CC, or a diagnostic request (CD) transmitted by the repair module MR and that will be described later.

It must be possible to provide the most probable diagnosis and if possible to attach a probability to it.

Preferably, this diagnostic module uses Bayesian networks and is similar to the "5530—Network Analyzer" product made by the Alcatel company. Consequently, operation of an implementation of this module is described in the technical document for the "5530" product. The technology of Bayesian networks and its application to determination of diagnoses are described for example in the book "*An introduction to Bayesian Networks*" by F. Jensen, UCL Press, 1996 or in the article "*IP VPN Network Diagnosis: Technologies and Perspectives*" by Gérard Delègue, Stéphane Betgé-Brezetz, Emmanuel Marilly and Olivier Martinot, 3rd International Conference on Networking, March 2004.

The principle of Bayesian networks uses the theory of probabilities that defines a rule to refine an assumption taking account of additional elements of proof and background information, and thus lead to a number representing the degree of probability that the assumption is true.

Therefore a Bayesian diagram defines all test actions to be undertaken associated with a probability and a cost, for example the cost being used to define which tests require more time than the others.

Figure 3:
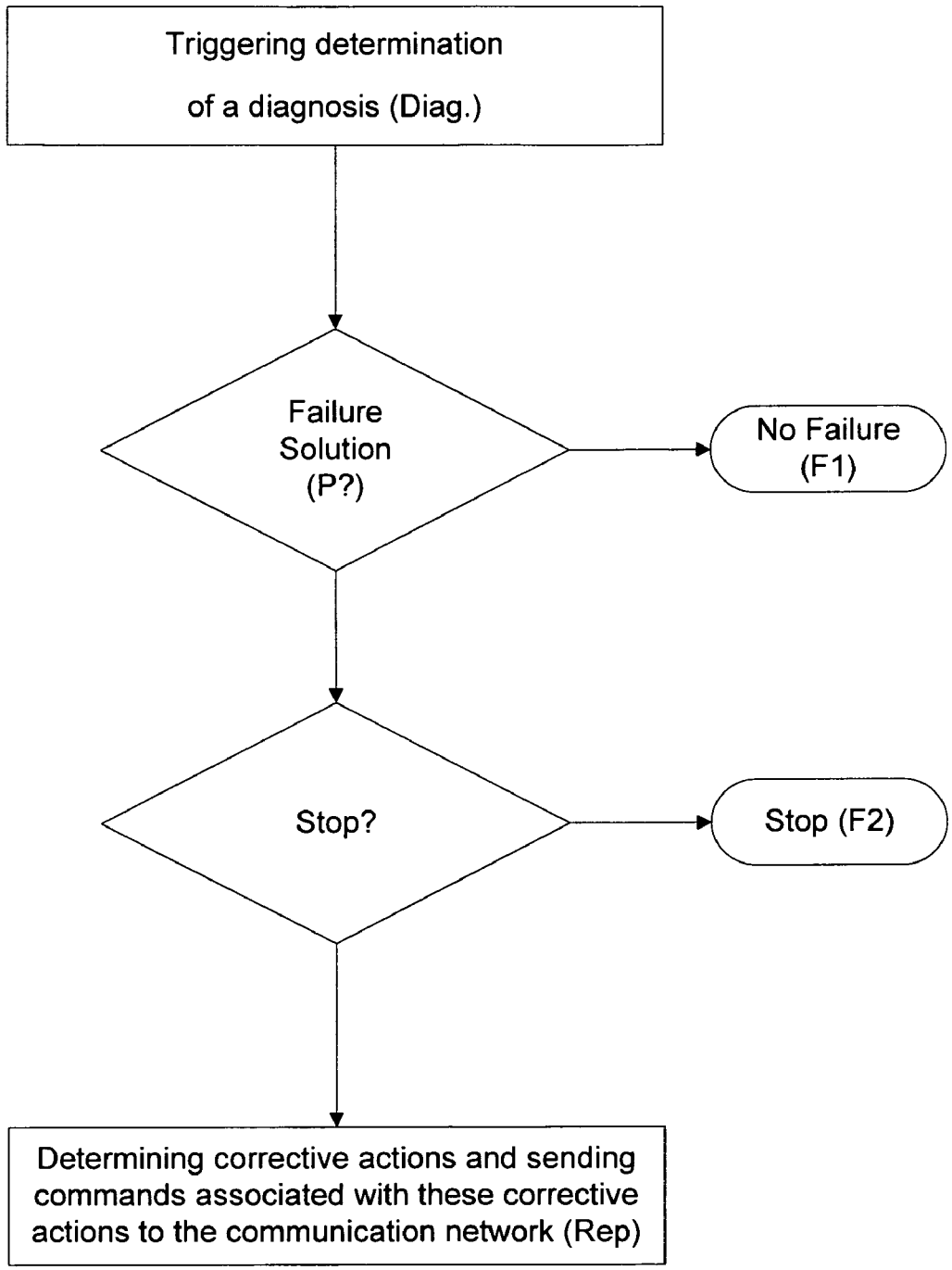
FIG. 3 illustrates the chaining of steps in the method according to the invention.

FIG. 3 illustrates an extremely simplified example of a Bayesian diagram. It shows that the "LossPacket" entity depends on several other entities, "HighCPUUtilization" ratio, "InterfaceINStatus" (interface input status), "InterfaceOutStatus" (interface output status).

Therefore, this model enables the system firstly to represent causal chains and therefore to indicate it the tests to be carried out, and secondly to calculate a probability value for each possible diagnosis and to determine the most probable diagnosis.

In practice, Bayesian diagrams are obviously more complex and may include several hierarchical levels. Furthermore, many diagrams are necessary to model a network element.

Once a diagnosis D has been determined, it is sent to the repair module MR in the form of one or several messages. For example, these messages may be compliant with the SNMP (*Simple Network Management Protocol*) protocol defined by IETF (*Internet Engineering Task Force*) in RFC 1157 and 1592 for versions 1 and 2 respectively.

It may be a single SNMP message (or "trap") or several messages. If several messages are used, they must be clearly identified so that the repair module MR can easily determine that relate to the same diagnosis D. According to one embodiment, the first message contains general information about the diagnosis, while the following message(s) contain(s) detailed information. For example, if the diagnosis relates to an LSP (Label Switching Point), the first message may contain diagnostic information about the LSP itself, while subsequent messages contain information about the equipment (or routers) through which the LSP passes.

This determination may be done using the ticket that will be explained later: all SNMP messages transporting the same diagnosis D will have the same ticket.

However, other embodiments are possible, particularly the two modules may communicate through a CORBA (Common Object Request Broker Architecture) type software bus like that defined by the OMG (Open Management Group) or COM/DCOM from the Microsoft company.

This message D must preferably contain the following information:

the title of the diagnosed failure. For example, "Interface down", "bad BGP configuration" (Border Gateway Protocol), etc.

the failure location, in other words an identifier of the network element, the card, the interface, the Virtual Private Network (VPN), etc., concerned.

a probability value that determines the confidence level at which the established diagnosis must be considered.

a ticket, in other words a number that identifies a search session for the right diagnosis for a given problem). As mentioned above, if the same diagnosis is transported by several messages, each of these messages will have the same ticket, particularly because the information volume is too high.

An iteration number that identifies the number of occurrences of a diagnostic search for a given ticket. It will be seen later that a problem can create a loop between the diagnostic module ND and the repair module MR, such that several iterations may be necessary to reach a solution to the problem.

The following table gives an example of an "SNMP trap" in the case of an implementation based on the SNMP protocol:

| SNMP "trap" field name | Description | OID (SNMP object identifier) | ASN 1 Type | Application format |
|---|---|---|---|---|
| Failure type | SNMP alarm description; Description of the failure for which the SNMP "trap" was generated. | 1.3.6.1.4.1.637.4.1 | String | String |
| Location | VPN ID | 1.3.6.1.4.1.637.4.2.1 | String | String |
| LSP | LSP ID; LSP identifier | 1.3.6.1.4.1.637.4.2.2 | String | Int |
| Router | Router ID; Router IP address | 1.3.6.1.4.1.637.4.2.3 | String | String |
| Interface | Index interface. SNMP index interface, | 1.3.6.1.4.1.637.4.2.4 | String | Int |
| Ticket | Ticket ID; Unique ticket identifying the failure. | 1.3.6.1.4.1.637.4.3 | String | Int |
| Reliability | Probability of the diagnosis. | 1.3.6.1.4.1.637.4.4 | String | Float |

-continued

| SNMP "trap" field name | Description | OID (SNMP object identifier) | ASN 1 Type | Application format |
|---|---|---|---|---|
| Iteration | Iteration in the diagnostic loop. | 1.3.6.1.4.1.637.4.5 | String | Int |
| Diagnostic scenario | Diagnostic scenario description. | 1.3.6.1.4.1.637.1.6 | String | String |

These OIDs files (SNMP Object IDentifiers) are composed of three parts: the left part (1.3.6.1.4.1.637.) corresponds to the Alcatel identifier, the next part (4.) corresponds to the application (i.e. the diagnostic module MD), and the last part corresponds to attributes specific to fields in the "SNMP trap".

On reception of a message containing a diagnosis D, the repair module D will attempt to determine one or several corrective actions.

Figure 2:
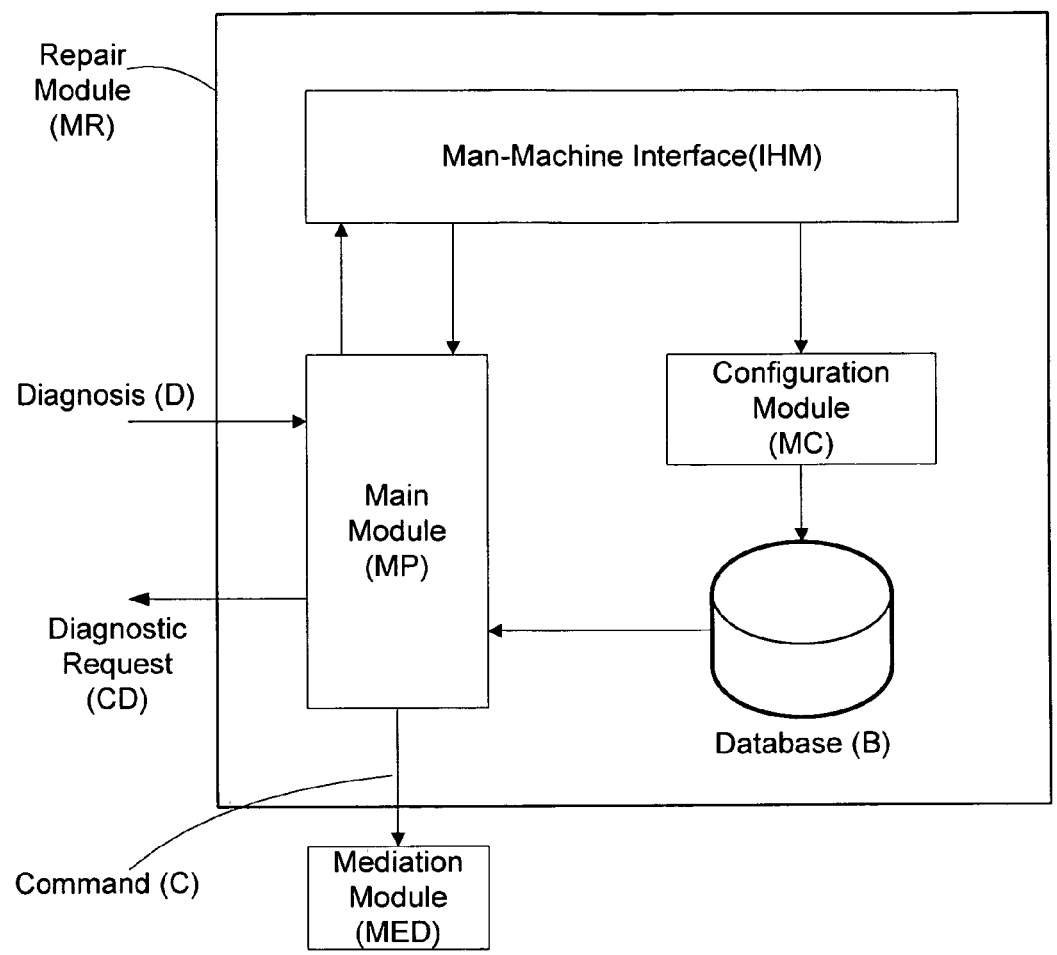
FIG. 2 shows an internal architecture of the repair module according to one embodiment of the invention.

FIG. 2 shows one possible functional architecture of the repair module MR. Since this architecture is functional, different embodiments are possible. According to this embodiment, the repair module MR comprises a main module MP, a man-machine interface IHM, a database B and a configuration module MC.

The diagnoses D are received by the main module MP, the purpose of which is to determine corrective actions and to send commands corresponding to these corrective actions either to a mediation module MED, or directly to network elements not shown in the figure.

Therefore, this determination is done from the diagnosis D and the information contained in it and that we have seen previously. However, it may also depend on other information such as internal logic, in other words formal definition of the policy to determine a corrective action based on at least one diagnosis, in a specific language. This internal logic is memorized in a database B.

parameters determined by the user, particularly using the IHM interface and the configuration module MC and memorized in the database B (or possibly in another separate database).

Information transmitted by the user through the IHM interface during production of the diagnosis, particularly in response to a proposal made by the main module MP.

According to one preferred embodiment of the invention, the internal logic is formally defined in the form of a set of rules.

These rules are used to associate diagnoses D that may be received from the diagnostic module MD, with corrective actions. They may be input into the base B through the configuration module MC and the IHM interface.

These rules may typically be expressed in the following form:

IF premises THEN actions in which "premises" is a list of conditions that must be satisfied so that the action(s) is (are) triggered. This list may contain several conditions related to each other conjunctively (by the AND logical operator) or disjunctively (by the OR logical operator).

For example, such rules may be written as follows:

If (Router=Alcatel/192.128.12.52, Interface=FastEthernet1/0)
  && ((Iteration=1)<3) && (Failure = INTERFACE_DOWN) Then
  (Execute Corrective Action 2).

-continued

If (Router=Alcatel/192.128.12.52, Interface=FastEthernet1/0)
  && ((Iteration=1)<3) && (Failure == BGP_MISCONFIGURATION
  ) Then (Execute Corrective Action 3).
  (Corrective Action 2) = Put (Router=Cisco/192.128.12.52,
  Interface=FastEthernet1/0)Interface Up.
  (Corrective Action 3) = Configure
  (Router=Alcatel/192.128.12.52, Interface=FastEthernet1/0)
  With BGP_Configuration_Script_1

An indicator may be associated with the formal definition of these rules, or in parameters associated with these rules, to specify if the corrective actions can be transmitted to the elements of the communication network directly, possibly through the mediation module MED, or if the operator has to validate them. If the operator has to validate them, the corrective actions are transmitted to the man-machine interface IHM to be displayed on a screen. These indicators may be memorized in the base B using the configuration module MC accessible to the operator through the man-machine interface IHM.

Apart from these corrective actions, other information may be displayed to help the operator in his decision, particularly information related to the diagnosis D transmitted by the diagnostic module MD.

The operator can then validate the proposal from the repair module MR before the repair module transmits the commands C to the network elements.

In the situation in which several corrective actions are possible, the IHM interface can display them on the screen and the user can then choose whatever he considers to the most appropriate. The repair module MR will then transmit the commands C corresponding to the corrective actions chosen by the operator, to the elements in the communication network.

Embodiments other than the preferred embodiment based on rules are also possible.

For example, Bayesian networks or neural networks could be used. The advantage of using neural networks is their ability of learning and their ability to function in uncertain situations. For example, they may be capable of applying the most probable corrective action to the most probable failure, even if a certain amount of information is missing. However, on the date of deposition of this application, the problem is the difficulty that communication network operators have in understanding such a technology.

As mentioned above, the commands C may be transmitted to elements in the communication network N through a mediation module MED. The purpose of this mediation module is to transform commands C formulated in a generic language by the repair module MR into specific commands $C_1$, $C_2$ compliant with command languages specific to the various equipment in the communication network.

Thus in FIG. 1, equipment $N_1$ and $N_2$ may be of different types, for example an IP router and a Media Gateway in order to connect this communication network N to another network not shown. It may also be a similar type of equipment but made by different suppliers. In both situations, the commands to be used to configure them must be appropriate to the command language understood by the equipment. Therefore a single generic command C (for example "open an interface") will lead to different specific commands for the two types of equipment $N_1$ and $N_2$, each of these specific commands being compliant with the language specific to the equipment, and particularly their CLI (Command Line Interface) interface.

Different products and technologies may be used to produce this mediation module MED.

In particular, a management architecture based on policy rules (PBM for "Policy-based Management") may be used. For example, patent applications EP1335524 entitled "Deployment of rules by a service management device as a function of information on network equipment" and EP1387526 entitled "Rule-based network management system comprising an inference motor" describe such architectures.

Thus, by determination of corrective actions, the repair module MR according to the invention can automate repair of the communication network, or semi-automate it in the case in which operator action is requested.

However, the complexity of communication networks is such that it is practically impossible to completely control the impact of corrective actions. Firstly, the repair may prove to be ineffective in solving the problem (for example because the diagnosis was incorrect, or also because the corrective actions were not entirely appropriate) and secondly, it is also possible that the real repair of the failure can generate a new failure. For example, in repairing a first failure, traffic transmission is allowed to network elements that were previously isolated, and in doing so a failure may be identified among these network elements.

Therefore, the applicant has considered the additional technical problem of minimizing insufficient or undesirable impacts on the communication network. To do this, after transmitting commands C to elements in the communication network, a diagnostic request CD is transmitted to the diagnostic module MD so that the diagnostic module can determine a new diagnosis.

This diagnostic request CD may contain the value of the ticket so that this new diagnosis (and any subsequent diagnoses) is related to the first diagnosis within a session determined by the same ticket.

Due to this loopback to the diagnostic module MD, the diagnostic module can verify correction of the failure and detect if a new failure could occur. It can then trigger a new repair through the repair module MR, and so on. Therefore, this preferred embodiment of the invention can be used to make a loop for controlling actions taken on the managed communication network.

However, this embodiment may cause the additional problem of creating infinite loops, in other words each repair will generate a new failure cyclically.

An iteration counter can be used to prevent these infinite loops. For example, this iteration counter is incremented every time that a new diagnosis is triggered. When this iteration counter reaches a given predetermined threshold, the loop is stopped and the system can notify the operator that no solution has been found, through the IHM interface.

Similarly for those skilled in the art, the counter may be initialized to the value of this threshold and decremented every time that a new diagnosis is triggered. The stop criterion is then the passage of this iteration counter to 0.

According to one embodiment of the invention, this iteration counter can have influence on the internal logic of the repair module. For example, in the situation in which this internal logic is implemented in the form of a set of rules, these rules may depend on the value of the iteration counter.

The operator can configure these dependences as a function of the constraints that he fixes. For example, on an unimportant LSP, the operator can associate a high iteration threshold (particularly since the resulting cost is lower than the cost of triggering the traffic optimization module, as will be described later). For a very important LSP in which there is an LSA with large penalties, the iteration threshold can be very low and the operator's main objective is to maintain the service even if the traffic optimization module has to be triggered.

Eventually, if the diagnoses relate to more serious problems on the communication network than there were at a given moment, a back tracking mechanism can be used to return to this network configuration. The repair module contains a history of corrective actions and/or commands sent and diagnoses received, for this purpose. If the new diagnosis when the threshold is reached is worse than it was for an earlier iteration, then the repair module can use this history to put the network back into the state corresponding to this iteration. All that is necessary then is to transmit inverse commands to restore this earlier situation.

If the failure cannot be genuinely solved, this embodiment enables a compromise for improving the state of the network.

After such back tracking, a message is sent to the operator through the man-machine interface IHM to inform him that the problem has not been solved and of the situation of the network.

According to another embodiment, a Traffic Engineering TE optimization module may be used if the diagnostic module cannot solve a problem. The purpose of this traffic optimization module is to redirect traffic to avoid the problem rather than to genuinely solve the problem. Thus, if a problem cannot be solved within a router (for example a hardware problem), the TE module can modify the routing tables on other routers, LSPs passing through this router, etc., so that no more traffic is sent to this router. Thus, the network behavior may become fully operational even if the equipment in question remains inoperative.

In summary, a diagnosis identifying a failure can have one of four conclusions: either it is repaired, or it is not repaired and the operator is notified, or there is no repair but the traffic optimization tool is triggered, or the repair module MR puts the network into a "less" bad state, using the back-tracking function, and notifies the operator.

FIG. 3 diagrammatically shows execution of steps in the method according to the invention.

A first "Diag" step consists of triggering determination of a diagnosis. This step is triggered particularly after reception of an alarm in the communication network or a customer complaint.

The system then determines if the diagnosis identifies a failure (box "P ?"). The method stops if there is no failure (box "F1") If there is a failure, the method consists of determining some stop criteria ("Stop ?"). The objective is to determine if the number of iterations has reached the predefined threshold, or if the diagnosis corresponds to a diagnosis previously produced during an earlier iteration. If these stop criteria are satisfied, the system stops (box "F2").

If not, the method uses a "Rep" step consisting of determining corrective actions and sending commands associated with these corrective actions to the communication network.

In one preferred embodiment of the invention, a new "Diag" diagnostic step is then triggered and the method then passes through the different steps and tests described above.

The method then forms a processing cycle that can be terminated by solution of the failure during a "P?" test or satisfaction of stop criteria during a "Stop?" test.

The invention and chaining of the different steps will become clearer after reading the following three specific examples.

In each of these examples, the diagnostic module is put into operation by reception of alarms from the communication network or by a customer complaint.

In a first example, a customer complaint CC or alarms A received from the communication network have demonstrated a problem within this network. A first diagnosis reveals that the interface X of a router Y is down. The diagnostic module MD transmits this diagnosis to the repair module, with a ticket value and an iteration value of 1.

The repair module MR then determines the corrective action associated with this diagnosis. In this example, the corrective action is to put the interface X back into service ("up"). A generic command associated with this corrective action is transmitted to the mediation module MED, that determines the appropriate command in the language specific to the router Y.

The repair module MR transmits a diagnostic request CD to the diagnostic module MD, specifying the same value of the ticket.

The diagnostic module MD repeats the diagnosis of the communication network and determines that the interface X of router Y is now up and that the network is operating normally. It can then send a diagnosis D to the repair module to signal that the network is operating normally. Since the problem has then been solved, the repair module MR does not trigger any action and the method according to the invention terminates.

In a second example, the diagnostic module also determines that the interface X of the router Y is down. In the same way as in the first example, the diagnosis D is sent to the repair module with a ticket, and the repair module MR determines a corrective action. The generic command associated with this corrective action is transmitted to the mediation module MED that converts it into a command compliant with the specific language of the router Y.

The repair module MR transmits a diagnostic request CD to the diagnostic module MD with the same ticket. The diagnostic module MD starts a new diagnostic determination. The new diagnosis D determines that the interface X of the router Y is still down. This diagnosis D is transmitted to the repair module MR with the same ticket, and an iteration value equal to 2.

The repair module MR may observe that although the iteration is equal to 2, the problem remains the same. It may then decide to transmit a command to the traffic optimization module TE (Traffic Engineering).

This traffic engineering module TE can then modify the existing paths in the communication network so that they avoid interface X of router Y. In this way, although the interface in question is down, the communication network can behave normally.

In a third example, the diagnostic module MD also determines that the interface X of the router Y is down. The diagnosis D is sent to the repair module with a ticket number and an iteration value equal to 1.

As above, the repair module determines the generic command to be sent to the mediation module MED that converts it into a command compliant with the language specific to the router Y so that the interface X is put into service ("up").

The repair module MR transmits a diagnostic request CD to the diagnostic module MD with the same ticket number.

The diagnostic module then triggers a new diagnostic determination and a new problem is found, for example bad configuration of the BGP (Border Gateway Protocol). This diagnosis D is transmitted to the repair module with an iteration number equal to 2 and the same ticket value.

The repair module MR then determines appropriate corrective actions that may in this case be to reconfigure the BGP protocol. Generic commands are then transmitted to the mediation module MED that converts them into specific commands.

Once again, the repair module MR sends a diagnostic request CD to the diagnostic module MD, specifying the same ticket number. The new diagnosis D shows that the same interface X of the router Y is down. This diagnosis D is transmitted to the repair module MR with an iteration value equal to 3 and still the same ticket value.

The repair module may observe that the iteration value is equal to 3 and that the diagnosis is the same as for iteration 1. It can then determine that it is incapable of solving the problem and transmit a command to the man-machine interface IHM causing the display of a message expressing this inability and information about the diagnosis.

These examples illustrate the different operating modes of the invention and particularly that the repair module MR according to the invention can be made to behave differently by configuring the rules base B, for example to inform the operator, trigger a traffic optimization module, trigger repair commands, etc.

The invention claimed is:

1. A management system for a communication network comprising:
   a diagnostic module configured to receive a first diagnostic request one of (1) indicating a new network malfunction and (2) including an identifier indicating a prior diagnosed network malfunction, said diagnostic module configured to assign a new identifier if said diagnostic request does not include said identifier, said diagnostic module configured to determine a diagnosis based on information provided by one or more elements of said communication network in said diagnostic request, said diagnosis identifying a failure within said communication network based on said network malfunction;
   a repair module configured to,
      determine one or more corrective actions based on at least said diagnosis received from said diagnostic module,
      transmit one or more commands corresponding to said one or more corrective actions, to one or more elements of said communication network, in order to correct said failure,
      transmit a second diagnostic request, including said identifier, to the diagnostic module to trigger determination of a new diagnosis by said diagnostic module, and
   a mediation module configured to transform said commands formulated in a generic language, into specific commands compliant with command languages specific to different equipment in said communication network.

2. The management system according to claim 1, wherein an iteration counter is incremented each time that a new diagnosis is triggered, said management system stopping the diagnosis and repair modules when said iteration counter has reached a threshold.

3. The management system according to claim 2, wherein the repair module has a history of diagnoses and corrective actions determined in each iteration and is configured to revert the communication network to a state for a given iteration, if the diagnosis is not as correct when said threshold is reached as it was for said given iteration.

4. The management system according to claim 1, wherein said repair module is configured to communicate with a traffic optimization module if corrective actions cannot be determined satisfactorily to correct said failure, to eliminate or limit the influence of said failure on the behavior of said communication network.

5. The management system according to claim 1, wherein said diagnostic module uses a Bayesian network to determine said diagnosis.

6. The management system according to claim 1, wherein said diagnosis contains at least one of a description of said failure, a location of said failure and an estimate of the probability associated with said diagnosis.

7. The management system according to claim 1, wherein said diagnostic module communicates said diagnosis to said repair module using a message compliant with the Simple Network Management Protocol (SNMP) protocol.

8. The management system according to claim 1, wherein said repair module has a repair rules base.

9. The management system according to claim 8, wherein an iteration counter is incremented each time that a new diagnosis is triggered said management system stopping the diagnosis and repair modules when said iteration counter has reached a threshold; and in which said rules may depend on said iteration counter.

10. A management method of a communication network comprising:
    receiving, by a diagnostic module, a first diagnostic request one of (1) indicating a new network malfunction and (2) including an identifier indicating a prior diagnosed network malfunction;
    assigning, by said diagnostic module, a new identifier if said diagnostic request does not include said identifier;
    determining, by said diagnostic module, a diagnosis based on information provided by elements of said communication network in said diagnostic request, said diagnosis identifying a failure within said communication network based on said network malfunction;
    determining, by a repair module, one or more corrective actions, if said diagnosis identifies a failure, based on at least said diagnosis and transmission of one or several commands corresponding to the one or more corrective actions, to one or more elements of said communication network, to correct said failure;
    transmitting a second diagnostic request, including said identifier, to the diagnostic module to trigger determination of a new diagnosis by said diagnostic module; and
    transmitting the commands through a mediation module configured to transform said commands formulated in a generic language into specific commands compliant with command languages specific to different equipments in said communication network.

11. The method according to claim 10, comprising:
incrementing an iteration counter each time a new diagnosis is triggered, and
stopping a diagnostic processing cycle if said iteration counter has reached a threshold.

12. The method according to claim 11, comprising:
determining a history of diagnoses and corrective actions in each iteration, and
reverting the communication network to a previous iteration state, if the diagnosis is not as correct when said threshold is reached as it was for this previous iteration.

13. The method according to claim 10, comprising:
transmitting a command to a traffic optimization module if corrective actions cannot be determined satisfactorily to correct said failure, to eliminate or limit the influence of said failure on the behavior of said communication network.

14. The method according to claim 10, wherein said determining said diagnosis uses a Bayesian network to determine said diagnosis.

15. The method according to claim 10, wherein said diagnosis contains at least one of a description of said failure, a location of said failure, and an estimate of the probability associated with said diagnosis.

* * * * *